(12) United States Patent
Ramström

(10) Patent No.: US 6,381,006 B1
(45) Date of Patent: Apr. 30, 2002

(54) SPATIAL POSITIONING

(75) Inventor: Karl Ramström, Dayton, OH (US)

(73) Assignee: Spectra Precision AB, Danderyd (SE)

( * ) Notice: Subject to any disclaimer, the term of this patent is extended or adjusted under 35 U.S.C. 154(b) by 0 days.

(21) Appl. No.: 09/614,800

(22) Filed: Jul. 12, 2000

(51) Int. Cl.[7] ............................ G01C 3/08; G01B 11/26
(52) U.S. Cl. ................. 356/4.01; 356/141.1; 356/152.1
(58) Field of Search ............................ 356/3.01, 141.1, 356/152.1, 3.09

(56) References Cited

U.S. PATENT DOCUMENTS

| | | | | |
|---|---|---|---|---|
| 3,865,491 A | * | 2/1975 | Hogan ........................ | 356/152 |
| 4,441,812 A | * | 4/1984 | Feist ......................... | 356/147 |
| 5,077,557 A | * | 12/1991 | Ingensand .................... | 342/52 |
| 5,100,229 A | * | 3/1992 | Lundberg et al. .............. | 356/1 |
| 5,110,202 A | | 5/1992 | Dornbusch et al. | |
| 5,229,828 A | * | 7/1993 | Wiklund ....................... | 356/4 |
| 5,313,409 A | * | 5/1994 | Wiklund et al. ............. | 364/556 |
| 6,046,800 A | * | 4/2000 | Ohtomo et al. ........... | 356/141.1 |

FOREIGN PATENT DOCUMENTS

| | | |
|---|---|---|
| EP | 0 701 702 B1 | 2/1997 |
| WO | WO 98/44363 | 10/1998 |

OTHER PUBLICATIONS

Geotronics, Survey Technology to Build On, Geotronics AB 1993–1994 Publ. No. 571 720 001 Printed in Sweden 03.94 Holmer & Co/Trosa Tryckeri (8 total pages).

Arcsecond, Vulcan User's Manual Arcsecond 44880 Falcon P1#100, Dulles VA 20166 USA (13 pages).

* cited by examiner

*Primary Examiner*—Thomas H. Tarcza
*Assistant Examiner*—Brian Andrea
(74) *Attorney, Agent, or Firm*—Killworth, Gottman, Hagan & Schaeff, L.L.P.

(57) ABSTRACT

Spatial positioning method and device are disclosed using at least one stationary station means positioned stationary in a field to be measured and providing referent site(s) in an area to be set-out or staked-out, and a portable position sensor means having at least two sensor elements, the position of each sensor element being indicated by a co-operation between the sensor element and said at least one stationary station means. In order to make said spatial positioning system able to measure to measuring points inaccessible for direct measurement a distance meter is provided in the portable position sensor means able to emit a visible beam. The visible beam is directed towards an inaccessible point to be measured at least during an alignment operation towards said point. The sensor elements are provided in the position sensor means in predetermined positions in relation to each other and to said distance meter. The position of said distance meter and position and orientation of an alignment line towards said inaccessible point for said distance meter are indicated. A measurement is made to the point. The position of the inaccessible point is computed based on measurement of said distance meter, measured positions of said sensor elements and the spatial positions of the distance meter and said elements in relation to each other.

12 Claims, 4 Drawing Sheets

SPATIAL POSITIONING

FIELD OF THE INVENTION

This invention relates essentially to a spatial positioning apparatus providing three-dimensional position information and a method to utilize the position information for improved surveying, construction layout, equipment operations, manufacturing control and autonomous vehicle control.

BACKGROUND OF THE INVENTION

Recently, a plurality of systems has been developed that only requires one person for the setting out when using a surveying equipment.

One kind of such equipment described in U.S. Pat. Nos. 5,100,229 and 5,110,202, having an applicant within the same group of companies as the applicant of this invention, comprises two, three or four referent stations on fixed positions at the area to be set out, each sweeping at least one spread beam vertically or obliquely towards the vertical plane across the site of interest. At least one portable position sensor, preferably provided on a staking-out rod is moved to different positions to be set-up or set out in the area to be monitored. Two or three portable sensors could be positioned on a working machine in order to keep track or the positions and orientations of the machine while in work. The portable sensor or sensors are provided with a computer system calculating the position of each measured position.

As illustrated in a user's manual regarding the system VULCAN edited by the company ARCSECOND, which has set the system described in U.S. Pat. Nos. 5,100,229 and 5,110,202 on the market, two sensors are provided on a rod having a tip at an extension of the rod adapted to be placed mechanically to a measuring point inaccessible from the referent stations. The extended rod has a determined and rather short length, which limits the positions that the operator can take when measurements to inaccessible points have to be made.

Another kind of such equipment comprises a surveying instrument, for example a total station manufactured by Spectra Precision AB, positioned at a fixed point in the area to be surveyed. Such an instrument could have a person directing the instrument towards a reflector, for example provided with at least one cube corner prism. However, most often the surveying instrument has the ability to search for and automatically lock to a target which position is to be determined. Such a surveying instrument is often referred to as a robotic total station. The target can either be a simple reflector or a reflector combined with an active target (i.e. a modulated LED). In this measuring system the measurement results are transferred to the rod by for instance a radio communication link. The computer unit at the rod or in the instrument calculates the position of the target. The person at the rod can also transfer commands to the total station via the same radio link. As this type of systems is considered to be state of the art, no further description will be given of it here.

However, there are often some points within the area to be set-up or set out which could not be reached directly by the surveying equipment due to obstacles in the area, such as trees, buildings or the like. Other points can not be reached by a detector or target, because they are too high above ground or close to some other object like a wall or in a corner. It is therefore a need to be able to make measurement also to points inaccessible from referent stations according to the first kind of equipment, or to points that are unreachable with a detector or target.

One solution to the problem of measurement against a inaccessible point is to use GPS technology as described in the co-pending U.S. application Ser. No. 09/402258 (corresponding to EP-98914184.1), which means providing the surveying instrument and the staking rod with a GPS antenna (GPS=Global Position Satellite). This system will however not function indoors. The antenna is normally large and difficult to position close to other objects.

Another solution to the problem is described in EP 90/906405.7 in which a surveying instrument could be measuring the position of another surveying instrument, which in turn is directed to a reflector arrangement. This arrangement functions well but is labourous for the operator or the operators making the setting-out staking-out work.

A technical problem to be solved with the invention is to provide a relatively simple and low cost surveying system in which positions that are inaccessible from referent stations or a surveying instrument or that are unreachable with a detector or target could be measured in an easy way.

OBJECTS OF THE INVENTION

An object of the invention is to provide a surveying method and surveying system by which objects inaccessible or not reachable with a detector/target from referent stations or the like could be easily measured.

Another object of the invention is to provide a surveying method and surveying system by which only one person could provide the surveying operations to measure measuring points in a whole area to be surveyed.

Still another object of the invention is to provide a surveying method and surveying system by which an operator could make all the measures to measuring points in the area to be monitored by means of only one portable equipment.

SUMMARY OF THE INVENTION

The invention relates to a spatial positioning system having at least one stationary station means positioned in a field to be measured and providing referent site(s) in an area to be set-out or staked-out, and a portable position sensor means having at least two sensor elements. The sensor elements could be regarded as detectors or targets, the position of which could be directly determined. The position of each sensor element is indicated by a co-operation between the sensor element and said at least one stationary station means. The spatial positioning system comprises, in order to make said spatial positioning system able to measure to measuring points not reachable for said stationary station means, or by a sensor, a distance meter provided in said portable position sensor means able to emit a visible beam to be directed towards a inaccessible point to be measured at least during an alignment operation towards said point and able to make a measurement to the point at control;

said sensor elements in the position sensor means having predetermined positions in relation to each other and to said distance meter for providing position of said distance meter and position and orientation of an alignment line towards said inaccessible point for said distance meter at control;

computer means for computing the position of the inaccessible point based on measurement of said distance meter, measured positions of said sensor elements and the spatial positions of the distance meter and said elements in relation to each other.

The sensor elements could be two and provided in line with said distance meter. As an alternative, the sensor elements could be at least three defining a plane. The distance meter has a predetermined position and orientation in relation to said sensor elements.

The at least one stationary station means could comprise at least two referent stations, each sweeping at least one spread beam across said area of interest, each sensor element including a light sensitive detector co-operating with a computer. The spatial position of each sensor element is then obtained through triangulation technique based on time marks received from each spread laser beam from said referent stations and indicated by said computer.

The at least one stationary station means could instead comprise a surveying instrument, and then each sensor element includes at least one target, to which the surveying instrument is automatically directed to measure and compute its position.

ADVANTAGES OF THE INVENTION

The advantage of the invention is that it is easy to handle by an operator working with staking-out or setting-out in an area. He or she need not provide different mounts of instruments in order to measure towards inaccessible or unreachable points. There are no limits other than accuracy as to the distance from the staking rod towards the inaccessible point to be measured. This makes the measuring task easy for the operator, who does not have to move to a position near to the inaccessible point when measuring its position.

BRIEF DESCRIPTION OF THE DRAWINGS

For a more complete understanding of the present invention and for further objects and advantages thereof, reference is now made to the following description of examples of embodiments thereof—as shown in the accompanying drawings, in which.

DETAILED DESCRIPTION OF THE PREFERRED EMBODIMENTS

Figure 1:
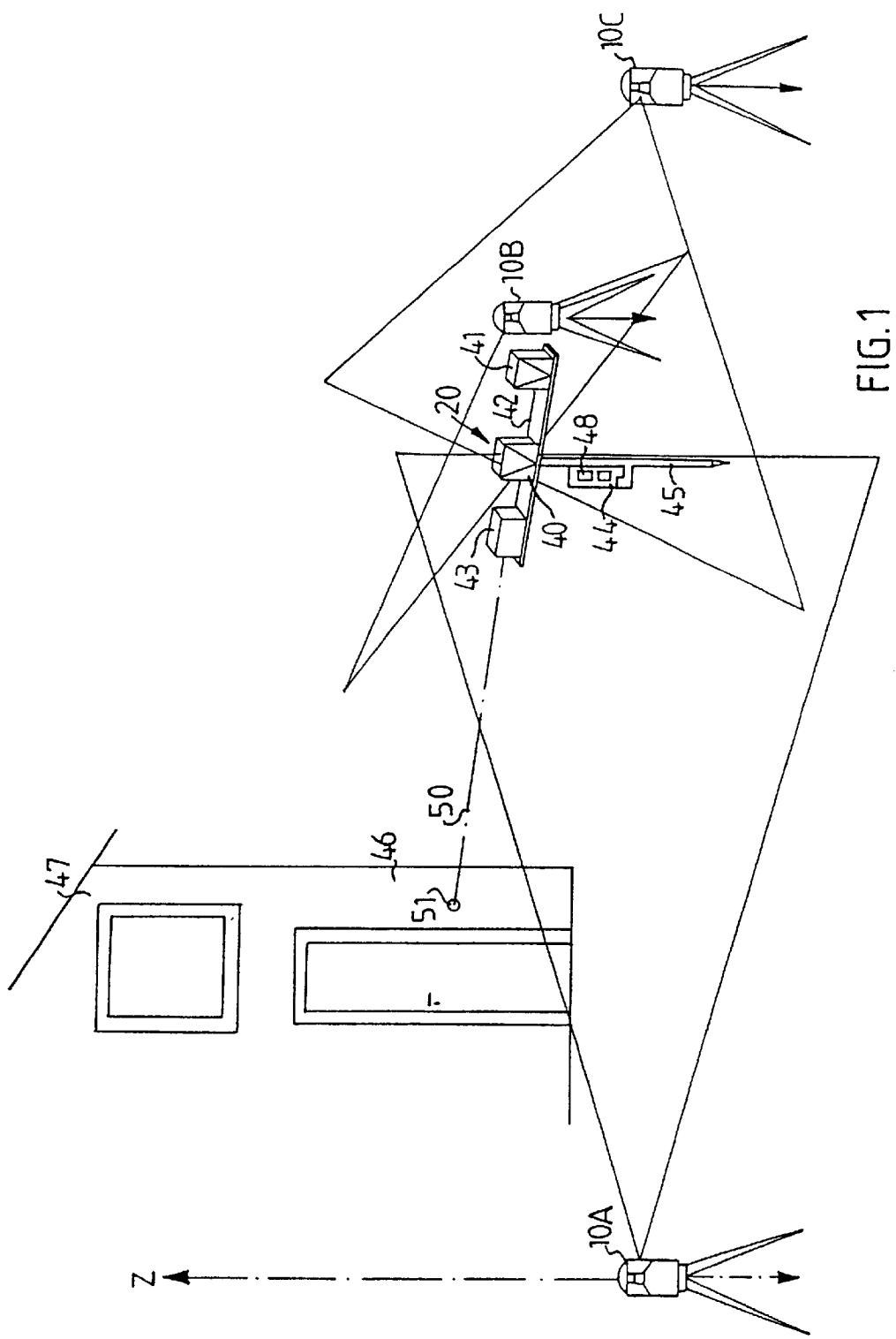
FIG. 1 illustrates schematically a first embodiment of the invention.

Referring to FIG. 1, a surveying equipment comprising three referent stations 10A, 10B and 10C on fixed positions at the area to be set out, each sweeping at least one spread beam vertically or obliquely towards the vertical plane across the site of interest. This kind of spatial positioning and measurement system is described in further detail in U.S. Pat. Nos. 5,100,229 and 5,110,202, the content of which is hereby incorporated by reference. A portable position sensor device 20 is carried around and positioned at different measuring points by an operator.

According to the invention the portable sensor device 20 comprises at least two sensor elements, in this embodiment, two sensor elements 40 and 41, which are provided at a predetermined distance from each other on a bearer 42. The spatial position of each sensor element is obtained through triangulation technique based on time marks received from each spread laser beam from the referent stations 10A, 10B and 10C. These position data are calculated in a computer unit 44 and can then be used by the same computer unit to calculate the position of the measuring point as will be described below. A distance meter 43 is also provided on the bearer 42. The distance meter 43 has a measuring beam 50 in line with the sensor elements 40 and 41.

The distance meter 43 should be able to have an exact measuring result and yet be small and easy to handle. A kind of distance meter suited for this task is described in PCT/SE99/01618 and another distance meter suited for the task is described in EP 0,701,702-B1. Both these kinds of distance meter could use a visible measuring beam. The first mentioned distance meter could alternatively use a visible beam for pointing at a point to be measured and then use an infrared beam for the actual distance measurement. These features are described in further detail in PCT/SE99/01618, the content of which is hereby incorporated by reference. However, the kind of distance meter is not critical. The main thing is that it makes exact distance measurements and is small and easy to handle. Normally, when the position of the portable sensor device 20 is measured, the position of the sensor element 40 is computed by the computer unit 44 provided on a rod 45, onto which the bearer 42 is mounted.

When a measurement shall be taken to an inaccessible measuring point 51, for example on a surface 46 of a house 47, the visible laser beam 50 is directed to that point. A position determination is initiated via the computer unit 44. The computer unit calculates the positions of the sensors 40 and 41 in a co-ordinate system defined by the referent stations 10A, 10B, and 10C using the technique described above, initiates a distance measurement of the distance meter 43 to the measuring point 51, and finally, using the results of these determinations together with the known position of the distance meter 43 relative to the sensors, calculates the position of the measuring point, and displays the result on the display and/or stores it in memory.

The positions of the elements 40, 41 and 43 are preferably such that they are mechanically balanced in relation to the rod 45. In this way it is easy for the operator to move the rod and to hold it still during each measurement operation. The position of the computer unit 44 on the rod should be such that it is ergonomic to handle by the operator.

In the described arrangement with the distance measuring beam in line with the two sensors, a rotation of the bearer around the axis through the sensors is not critical, since it has not influence on the result, and this is normally preferable. If for some reason this arrangement is not possible or desirable, the principle can be extended to an arrangement, where the limitation of placing the distance meter co-linear with the sensors is eliminated.

Figure 2A:
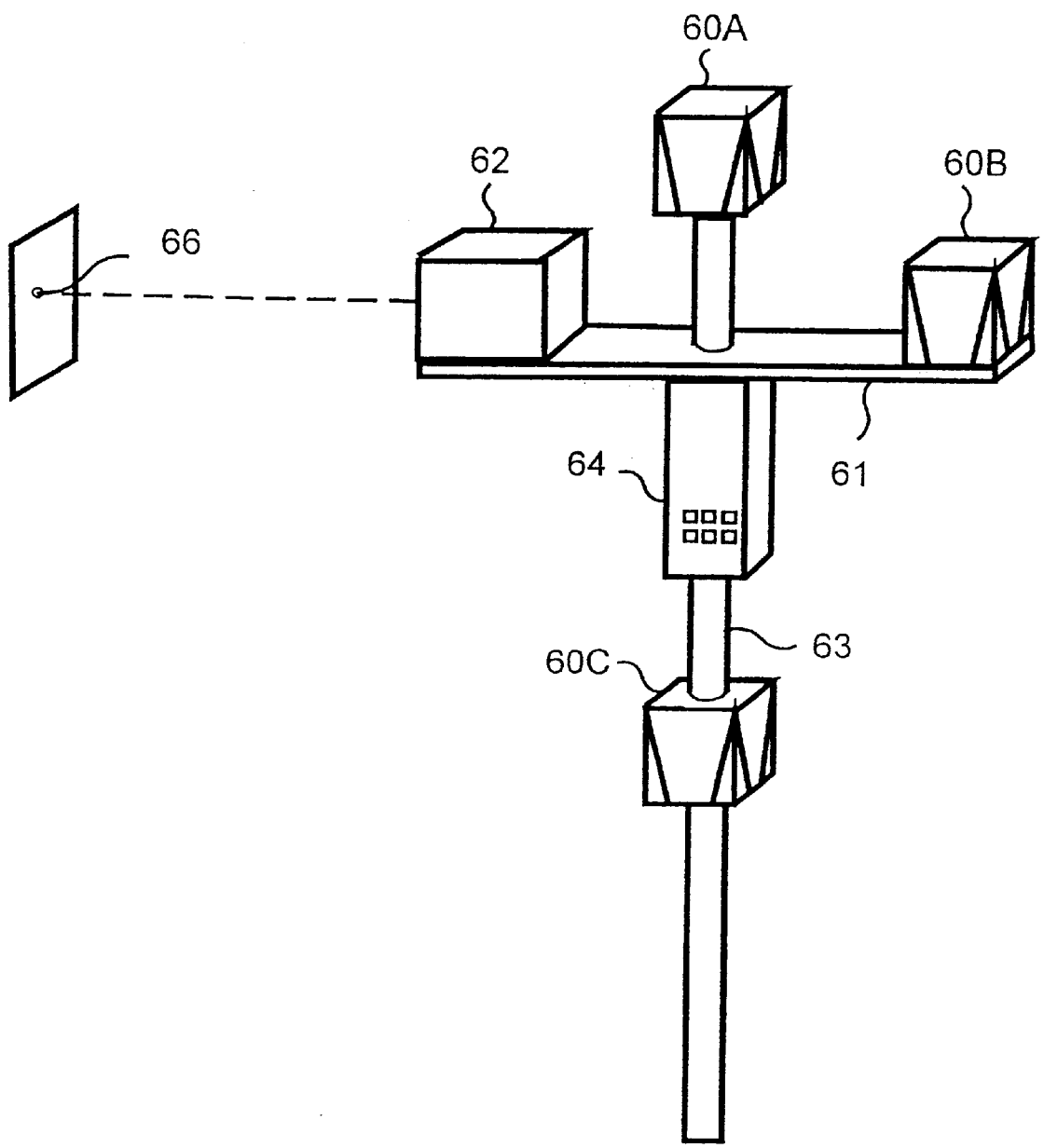
FIGS. 2A & 2B illustrate schematically a second embodiment of the invention.

Such a situation is illustrated in FIG. 2A. In this case sensors 60A, 60B, and 60C are needed to define a plane. The distance meter 62 should be mounted in a fixed and known relation to these sensors in the same way as earlier described for two sensors. It is shown placed on a platform 61 placed on a rod 63 above the computer 64. By using the distance meter 62 to determine the distance to the measuring point aimed at the point of interest 66 the geometry of the set-up is fully determined. The position of the point of interest can be calculated by the computer 64. (These computations are based on pure geometry and can be performed by any person skilled in the art and need therefore not be further described).

Figure 2B:
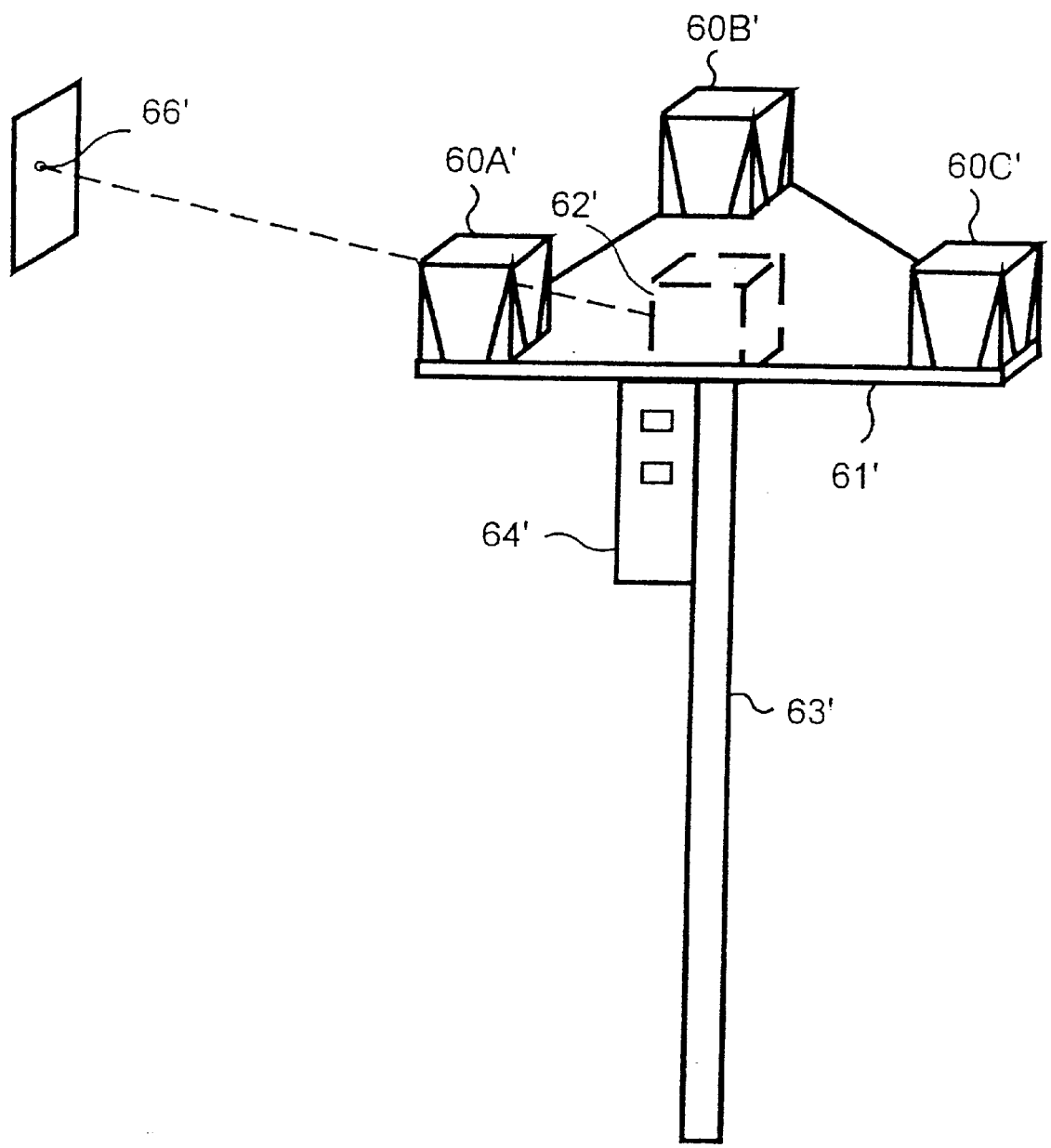

FIG. 2A shows the sensors 60A, 60B, and 60C placed in a vertical plane. They could naturally be placed in any plane. FIG. 2B shows an embodiment, in which they are positioned in a horizontal plane, here on a platform 61' provided on the top of the distance meter 62'. The distance meter 62' is in turn placed on top of the staking rod 63'.

Figure 3:
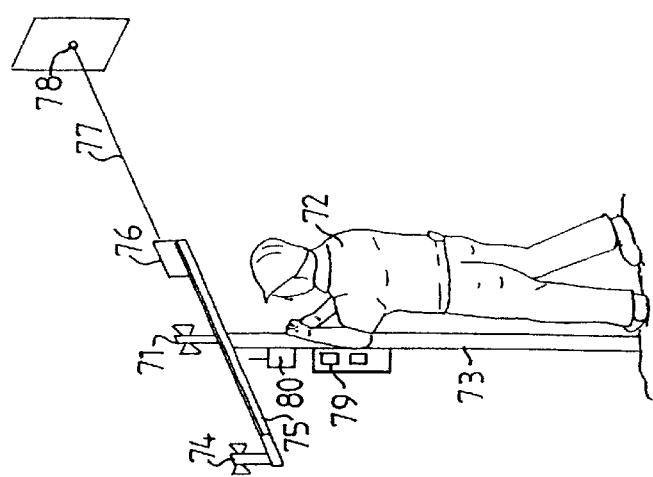
FIG. 3 illustrates schematically a third embodiment of the invention.
Figure 3:
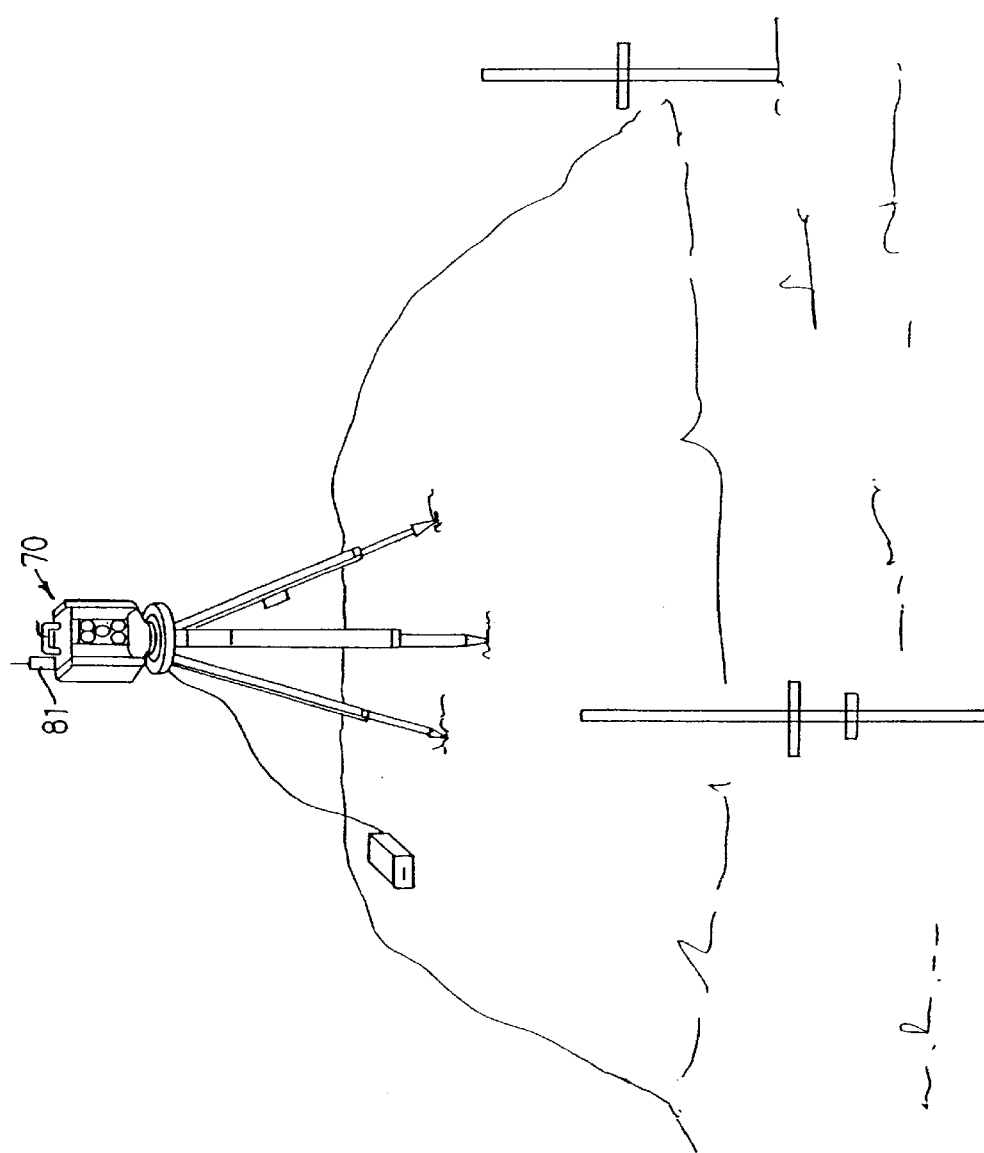

The third embodiment shown in FIG. 3, comprises a surveying instrument 70, which can be a so called robotic total station. It could comprise an Electronic Distance Meter (EDM) as its distance measuring device and measures also automatically the horizontal and vertical angle of the direction towards a target of the instrument. Such an instrument can automatically search and lock to a target, which may be a single reflector or a reflector combined with an active device, like a modulated LED transmitter as mentioned above. The reflector or reflector/transmitter combination is referred to as the target.

At normal staking-out operation, i.e. when the actual position of the target on the rod 73 is to be measured, the operator sees to that the surveying instrument 70 follows and makes measurements to the target 71. Each operation is ordered by a radio transmitter 80 at the rod and received by a radio receiver 81 at the instrument 70. Every other kind of suitable transmitting and receiving could be used. Thus, the surveying instrument 70 is controlled by the person 72 standing at the rod 73.

However, when an inaccessible position is to be measured, the station 70 searches for and locks to a target 71 or 74 placed at the rod 73. By electronically controlling a transmitter part of the target, or by mechanically shielding, or by other means making one target not visible, the computer unit can direct the robotic total station to first lock to the target 71 and then to the target 74 and determine their two positions. Having done this, or even simultaneously to this a distance measurement can be made to the point of interest 78 from a distance meter 76, being of the same kind as discussed in relation to FIG. 1. Using the positions of the two targets, the distance from the distance meter 76 to the point 78 and the given relative position relation between the distance meter and the two targets the position of the point 78 can be computed and displayed and/or stored in memory in the same way as described earlier.

Thus, like in the other embodiments, the distance meter 76 in the portable position sensor means is able to emit a visible beam. The visible beam from the distance meter 76 is directed towards the inaccessible point 78 to be measured at least during an alignment operation towards said point. The sensor elements 71 and 74 are provided in the position sensor means in predetermined positions in relation to each other and to the distance meter 76. The position of the distance meter 76 and position and orientation of an alignment line 77 towards said inaccessible point for the distance meter is determined and a measurement to the point is made. The computer 79 computes the position of the inaccessible point 78.

Even though a robotic total station has been described above it lies within the scope of invention to have a manned surveying instrument instead. There an operator could make the measurements towards the reflectors by hand.

It is apparent that the configuration in FIGS. 2A and 2B using three sensors can also be implemented using a robotic total station and three targets.

In general, although the invention is described with respect to exemplary embodiments it should be understood that modifications can be made without departing from the scope thereof. Accordingly, the invention should not be considered to be limited to the described embodiments, but defined only by the following claims, which are intended to embrace all equivalents thereof.

What is claimed is:

1. Spatial positioning method using at least one stationary station positioned stationary in a field to be measured and providing referent site(s) in an area to be set-out or staked-out, and a portable position sensor having at least two sensor elements, the position of each sensor element being indicated by a cooperation between the sensor element and said at least one stationary station, said spatial positioning method able to measure points inaccessible for direct measurement, and comprising the following steps:

providing a distance meter in said portable position sensor able to emit a visible beam;

directing the visible beam towards an inaccessible point to be measured at least during an alignment operation towards said point;

providing said sensor elements in the portable position sensor in predetermined positions in relation to each other and to said distance meter;

indicating the position of said distance meter and position and orientation of an alignment line towards said inaccessible point for said distance meter;

making a measurement to the point; and, computing the position of the inaccessible point based on measurement of said distance meter, measured positions of said sensor elements and the spatial positions of said distance meter and said sensor elements in relation to each other.

2. Spatial positioning method according to claim 1, wherein said sensor elements comprise two sensor elements provided in line with said distance meter.

3. Spatial positioning method according to claim 1, wherein:

said sensor elements comprise at least three sensor elements defining a plane; and, said distance meter is provided at a predetermined position and orientation in relation to said sensor elements.

4. Spatial positioning method according to claim 1, wherein:

said at least one stationary station comprises at least two referent stations, each sweeping at least one spread beam across an area of interest;

each sensor element including a light sensitive detector co-operating with a computer; and, the spatial position of each sensor element is obtained through triangulation technique based on time marks received from each spread beam from said referent stations and indicated by said computer.

5. Spatial positioning method according to claim 1, wherein:

said at least one stationary station comprises a surveying instrument; and, each sensor element comprises at least one target, to which said surveying instrument is automatically directed to measure and compute its position.

6. Spatial positioning method according to claim 1, wherein:

said at least one stationary station comprises a surveying instrument; and, each sensor element comprises at least one target, to which said surveying instrument is manually directed to measure and compute its position.

7. Spatial positioning system having at least one stationary station positioned stationary in a field to be measured and providing referent site(s) in an area to be set-out or staked-out, and a portable position sensor having at least two sensor elements, the position of each sensor element being indicated by a co-operation between the sensor element and said at least one stationary station, said spatial positioning system able to measure points inaccessible for direct measurement, and comprising:

a distance meter provided in said portable position sensor able to emit a visible beam to be directed towards an inaccessible point to be measured at least during an alignment operation towards said point, and able to make a measurement to the point;

said sensor elements in the position sensor having predetermined positions in relation to each other and to said distance meter for providing the position of said distance meter and the position and orientation of an alignment line towards said inaccessible point for said distance meter; and, a computer arranged to compute the position of the inaccessible point based on measurement of said distance meter, measured positions of said sensor elements and the spatial positions of the distance meter and said sensor elements in relation to each other.

8. Spatial positioning system according to claim 7, wherein said sensor elements comprise two sensor elements provided in line with said distance meter.

9. Spatial positioning system according to claim 7, wherein:

said sensor elements comprise at least three sensor elements defining a plane, and, said distance meter comprises a predetermined position and orientation in relation to said sensor elements.

10. Spatial positioning system according to claim 7, wherein:

said at least one stationary station comprises at least two referent stations, each sweeping at least one spread beam across an area of interest;

each sensor element includes a light sensitive detector co-operating with a computer; and, the spatial position of each sensor element is obtained through triangulation technique based on time marks received from each spread beam from said referent stations and indicated by said computer.

11. Spatial positioning system according to claim 7, wherein:

said at least one stationary station comprises a surveying instrument; and, each sensor element includes at least one target, to which said surveying instrument is automatically directed to measure and compute its position.

12. Spatial positioning system according to claim 7, wherein:

said at least one stationary station comprises a surveying instrument; and, each sensor element includes at least one target, to which said surveying instrument is manually directed to measure and compute its position.

* * * * *